United States Patent Office 3,332,292
Patented July 25, 1967

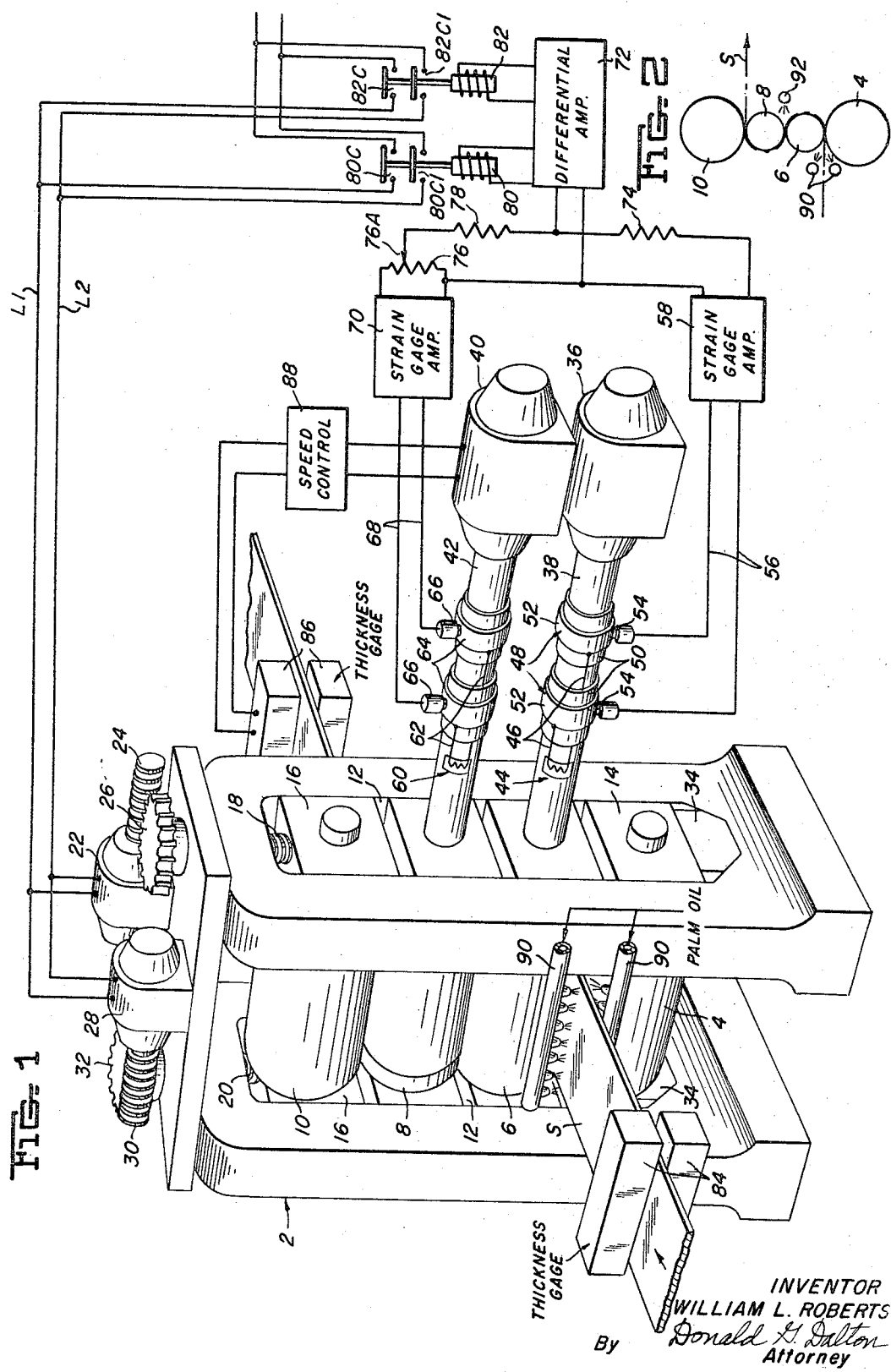

3,332,292
METHOD AND APPARATUS FOR ROLLING STRIP
William L. Roberts, Murrysville, Pa., assignor to United States Steel Corporation, a corporation of Delaware
Filed Apr. 7, 1965, Ser. No. 446,222
14 Claims. (Cl. 72—8)

This invention relates to a method and apparatus for rolling strip and more particularly to the rolling of light gauge steel strip. In conventional strip rolling, the rolling pressure increases as the thickness of the strip decreases. The increased pressures cause roll flattening and strip shape problems. To alleviate these problems it is desirable to increase the strip tensions on both the entry and exit sides of the mill. However, the amount of tension must be limited since work hardened thin strip is prone to tear due to non-uniformity of the applied tensile stresses.

It is therefore an object of my invention to provide apparatus for rolling strip under compression and tension in which a predetermined ratio is maintained between the compressive and tension forces.

Another object is to provide such a method in which large reductions are made while maintaining the strip gauge uniform.

Still another object is to provide such a method in which the friction between the rolls and strip is different at different rolls.

A further object is to provide apparatus suitable for carrying out the method of my invention.

These and other objects will be more apparent after referring to the following specification and attached drawings, in which:

FIGURE 1 is a schematic isometric view of the apparatus of my invention; and

FIGURE 2 is a schematic view of a detail of my invention.

Referring more particularly to the drawings, reference numeral 2 indicates a housing in which are supported rolls 4, 6, 8 and 10. The housing 2 has aligned windows 12 at each end of the rolls with the lowest roll 4 being supported in chocks 14 and the upper roll 10 being supported in chocks 16, the chocks being received in the windows 12. Screwdowns 18 and 20 bear against chocks 16. Screwdown 18 is rotated from the motor 22 through worm 24 and gear 26 attached to the top of the screwdown 18. Screwdown 20 is rotated from a motor 28 through worm 30 and gear 32 attached to the screwdown 20. Power for driving the motors 22 and 28 is delivered through D.C. leads L1, L2.

A load measuring device such as Pressductor load cell 34 is positioned between the roll chock 14 and the wall of window 12. The parts so far described are conventional. In a 4-high rolling mill according to my invention I provide a motor 36 for driving shaft 38 which is connected to roll 6 and a motor 40 for driving shaft 42 which is connected to roll 8. A strain gage assembly 44 is secured to the shaft 38 and leads 46 therefrom are connected to slip rings 48. Each of the slip rings 48 includes an insulating ring 50 surrounding the shaft 38 and a conductor ring 52 surrounding the ring 50. A spring pressed brush or brushes 54 bear against the ring 52. Lead 56 from each brush 54 is connected to a strain gage amplifier 58. In like manner a strain gage assembly 60 is secured to the shaft 42 and leads 62 therefrom are secured to slip rings 64. Brushes 66 pick up the current from slip ring 64 and feed it through leads 68 to a strain gage amplifier 70. The type of strain gage and amplifier may vary but a satisfactory type is disclosed in the operating instruction for amplifier Model RD–561211 of Brush Instruments Company of Cleveland, Ohio. The strain gages and amplifiers are connected in a manner well known to those skilled in the art to indicate the torque of the drive shafts with voltages being developed at the outputs of amplifiers 58 and 70 proportional to the torques on shafts 38 and 42, respectively.

The outputs of the amplifiers 58 and 70 are impressed upon and compared by a differential amplifier 72. The output of amplifier 58 is connected to the differential amplifier 72 through a resistor 74 and the output of amplifier 70 is connected to the differential amplifier 72 by means of a potentiometer 76, arm 76A of which is connected to a resistor 78 having a value equal to that of resistor 74. The desired ratio between the torques on shafts 38 and 42 is set up on potentiometer 76 by adjusting its arm 76A with the potential impressed on amplifier 72 being zero when the desired ratio of torques occurs. When the ratio of torques varies from that desired either a negative or a positive potential will be fed to the amplifier 72. Two relays 80 and 82 are connected to the output of amplifier 72 with one relay 80 being energized when the input to amplifier 72 has one polarity and the other relay 82 being energized when the input to amplifier 72 has the opposite polarity. Relay 80 has normally open contacts 80C and 80C1 and relay 82 has normally open contacts 82C and 82C1. When contacts 80C and 80C1 are closed, motors 22 and 28 will cause the screws 18 and 20 to be driven downwardly whereas closing of contacts 82C and 82C1 will cause the screws 18 and 20 to be driven upwardly.

A thickness gage 84 measures the thickness of strip S being fed between rolls 4 and 6 and a thickness gage 86 measures the thickness of the reduced strip leaving the mill. A speed control 88 connected to the output of gage 86 controls the speed of motor 40 to maintain the gage constant. This may be done in many ways such as by that described in an article entitled, "Tandem Cold Reduction Mill With Automatic Gage Control," by R. A. Phillips in the January 1957 issue of "Applications and Industry" published by American Institute of Electrical Engineers.

A lubricant such as palm oil is applied to the strip S in sprays from nozzles 90 at the entry end of the mill. A detergent emulsifier, cleaner or solvent is applied at the roll bite between rolls 6 and 8 from nozzles 92. These liquids decrease the lubricating properties of the rolling lubricant. In this manner the friction associated with the work roll 8 will be higher than that associated with the work roll 6. The reason for this is that the torque on shaft 42 must be greater than that on the shaft 38. It should be noted that the detergent is carried down the surface of the roll 8 to the pass between rolls 6 and 8, but it does not deteriorate the lubricant on the surface of the strip S entering the bite between rolls 6 and 8. However, the co-efficient of friction increases rapidly as the strip leaves the bite between rolls 6 and 8.

In operation, arm 76A is positioned to give a predetermined ratio between the torques on shafts 38 and 42, this being an indication of the amount of tension being applied to the strip S. There will always be a positive torque on shaft 42, but there may be a negative torque on shaft 38 in which case motor 36 will act as a drag generator. Speed control 88 is set so as to obtain a predetermined thickness of strip S leaving the mill. With the strip S threaded through the mill as shown and with the adjustments made as set forth above, strip of uniform gauge will be obtained without any change in the settings. If the relationship between the torques on shafts 38 and 42 varies from the preset value a negative or positive potential will be fed to amplifier 72. If too much tension is being applied this signal will cause contacts 80C and 80C1 to close, thus causing motors 22 and 28 to rotate screws 18 and 20 to force the roll 10 downwardly and thus increase the compression on the strip. This movement will continue until the ratio between compression and tension is that desired at which time the inputs to differential amplifier 72 will be balanced so that contacts 80C and 80C1 will open, thus stopping rotation of motors 22 and 28. If, on the other hand, the tension being applied is too little, the potential at differential amplifier 72 will be of such polarity that contacts 82C and 82C1 will close, thus causing motors 22 and 28 to rotate in the reverse direction with screws 18 and 20 rotating upwardly. Rotation of the motors 22 and 28 will continue until the desired ratio between the compressive and tension forces is again reached at which time the potential on amplifier 72 will be zero and contacts 82C and 82C1 will open. If the thickness of the strip being delivered from between rolls 8 and 10 is greater than that desired, control 88 will cause the motor speed 40 to increase and if the thickness is less the control 88 will cause the motor speed 40 to decrease. In either case the ratio between torques 38 and 42 will be disturbed and the differential amplifier 72 will cause operation of the motors 22 and 28 in the desired direction as discussed above to bring the ratios between the torques on shafts 38 and 42 back to the preset value.

While one embodiment of my invention has been shown and described it will be apparent that other adaptations and modifications may be made without departing from the scope of the following claims.

I claim:
1. Apparatus for rolling strip under compression and tension comprising a pair of rotatable rolls, the strip first passing around the first of said rolls, then between the first and second rolls under compression and then around the second roll, means for moving the rolls toward and away from one another to vary the gap therebetween, a first drive shaft for said first roll, a second drive shaft for said second roll, a motor connected to said second drive shaft, means for obtaining an impulse proportional to the torque on said first drive shaft, means for obtaining an impulse proportional to the torque on said second drive shaft, means comparing the torque impulses on said first and second drive shafts, and means responsive to a signal from said torque comparing means to move the rolls toward one another when the ratio between the torques varies from a preset amount in a direction indicating too much tension and to move the rolls away from one another when the ratio between the torques varies from the preset amount in a direction indicating too little tension.

2. Apparatus for rolling strip according to claim 1 including a thickness gauge for measuring the thickness of said strip leaving said rolls, and means operable by a signal from said gauge for controlling the speed of said motor to maintain a desired thickness of strip.

3. Apparatus for rolling strip under compression and tension comprising a housing, four rolls rotatably supported in said housing, one above another with the strip passing between the bottom two rolls, around the second roll from the bottom, between the second and third rolls from the bottom, around the third roll from the bottom, and then between the third and fourth rolls from the bottom, means for moving the rolls toward and away from one another to vary the gap therebetween, a first drive shaft for the second roll from the bottom, a second drive shaft for the third roll from the bottom, a motor connected to said second drive shaft, means for obtaining an impulse proportional to the torque on said first drive shaft, means for obtaining an impulse proportional to the torque on said second drive shaft, means comparing the torque impulses on said first and second drive shafts, and means responsive to a signal from said torque comparing means to move the rolls toward one another when the ratio between the torques varies from a preset amount in a direction indicating too much tension and to move the rolls away from one another when the ratio between the torques varies from the preset amount in a direction indicating too little tension.

4. Apparatus for rolling strip according to claim 3 including a thickness gauge for measuring the thickness of said strip leaving said rolls, and means operable by a signal from said gauge for controlling the speed of said motor to maintain a desired thickness of strip.

5. Apparatus for rolling strip according to claim 3 including means for applying a lubricant to the strip as it enters between the said first and second rolls, and means for applying a friction increasing liquid to the said third roll.

6. Apparatus for rolling strip according to claim 5 including a thickness gage for measuring the thickness of said strip leaving said rolls, and means operable by a signal from said gauge for controlling the speed of said motor to maintain a desired thickness of strip.

7. The method of rolling strip under compression and tension which comprises passing a strip around a first roll, then passing the strip between said first roll and a second roll, then passing the strip around the second roll, applying compression to the strip as it passes between the rolls, applying sufficient tension to the strip to elongate the same, and maintaining a predetermined ratio between the compressive and tension forces.

8. The method of rolling strip under compression and tension which comprises passing a strip around a first roll, then passing the strip between said first roll and a second roll, then passing the strip around the second roll, applying compression to the strip as it passes between the rolls, driving said first roll, driving said second roll, measuring the torque of said first roll, measuring the torque of said second roll, comparing the torques on said first and second rolls, and moving the rolls toward and away from one another as the torques vary from a predetermined ratio to maintain a predetermined ratio between the compressive and tension forces.

9. The method of rolling strip according to claim 8 including the step of varying the speed of the second roll responsive to the thickness of the strip leaving the second roll to maintain constant strip thickness.

10. The method of rolling strip under compression and tension which comprises passing a strip between a first and second roll, then passing the strip around said second roll and between the second roll and a third roll, then passing the strip around the third roll and between the third roll and a fourth roll, applying sufficient compression to the strip as it passes between the rolls to reduce its thickness, applying sufficient tension to the strip between the second and third rolls to elongate the same, and maintaining a predetermined ratio between the compressive and tension forces.

11. The method of rolling strip under compression and tension which comprises passing a strip between a first and second roll, then passing the strip around said second roll and between the second roll and a third roll, then passing the strip around the third roll and between the third roll and a fourth roll, applying sufficient compression to the strip as it passes between the rolls to reduce its thickness, driving said second roll, driving said third roll, measuring the torque of said second roll, measuring the torque of said third roll, comparing the torques on said second and third rolls, and moving the rolls toward and away from one another as the torques vary from a predetermined ratio to maintain a predetermined ratio between the compressive and tension forces.

12. The method of rolling strip according to claim 11 including the step of varying the speed of the third roll responsive to the thickness of the strip leaving the fourth roll to maintain constant strip thickness.

13. The method of rolling strip according to claim 11 including the steps of lubricating the strip as it enters between the first and second rolls, and increasing the friction between the strip and third roll over that between the strip and second roll.

14. The method of rolling strip according to claim 13 including the step of varying the speed of the third roll responsive to the thickness of the strip leaving the fourth roll to maintain constant strip thickness.

References Cited
UNITED STATES PATENTS

| | | | |
|---|---|---|---|
| 2,287,283 | 6/1942 | Weber | 72—8 |
| 2,316,067 | 4/1943 | Hickman | 72—205 |
| 2,332,797 | 10/1943 | Hume | 72—199 |
| 2,392,323 | 1/1946 | Koss | 72—205 |
| 2,526,296 | 10/1950 | Stone | 72—205 |
| 3,036,480 | 5/1962 | Schwab | 72—11 |
| 3,089,363 | 5/1963 | Wallace et al. | 72—8 |
| 3,100,410 | 8/1963 | Hulls et al. | 72—8 |
| 3,170,344 | 2/1965 | Marrs | 72—11 |

CHARLES W. LANHAM, *Primary Examiner.*

A. RUDERMAN, *Assistant Examiner.*